United States Patent [19]

Henne et al.

[11] Patent Number: 4,911,554

[45] Date of Patent: Mar. 27, 1990

[54] ROTATABLE DRUM

[76] Inventors: Heinrich Henne, Freesland 22, 4722 Ennigerloh; Hubert Grothaus, Kronesch 11, 4504 Bad Iburg, both of Fed. Rep. of Germany

[21] Appl. No.: 133,568

[22] Filed: Dec. 16, 1987

Related U.S. Application Data

[63] Continuation-in-part of Ser. No. 764,341, Aug. 12, 1985, abandoned.

[30] Foreign Application Priority Data

Sep. 14, 1984 [DE] Fed. Rep. of Germany ....... 3433905

[51] Int. Cl.[4] .......................... B01F 9/02; F16H 1/06

[52] U.S. Cl. ...................................... 366/220; 74/414; 366/233

[58] Field of Search ................... 366/63, 62, 220, 221, 366/222, 223, 224, 225, 226, 227, 228, 229, 230, 231, 233; 34/108, 142; 432/103; 384/206, 403, 213, 129, 549; 74/467, 414, 396, 397

[56] References Cited

U.S. PATENT DOCUMENTS

| | | | |
|---|---|---|---|
| 694,565 | 3/1902 | Mason, Jr. | 366/233 X |
| 2,298,016 | 10/1942 | Lincoln | 366/227 X |
| 2,396,057 | 3/1946 | Petersen | 34/142 X |
| 2,420,217 | 5/1947 | Allen | 366/233 X |
| 3,036,823 | 5/1962 | Taylor | 366/233 |
| 3,219,322 | 11/1965 | Murer | 366/220 |
| 4,234,237 | 11/1980 | Kiriazaros | 384/549 X |
| 4,300,292 | 11/1981 | Vadas et al. | 432/103 X |
| 4,470,324 | 9/1984 | Renk et al. | 74/467 X |

*Primary Examiner*—Harvey C. Hornsby
*Assistant Examiner*—Scott J. Haugland
*Attorney, Agent, or Firm*—Learman & McCulloch

[57] ABSTRACT

A rotatable drum having a casing to one end of which is joined one end of an axially extending, coaxial bearing ring having its other end joined to a driving ring gear. The bearing ring is rotatably supported on bearing surfaces which are adjustable relative to the axis of rotation of the drum so as to effect adjustments of the casing. The ring gear and its driving pinion are enclosed within a fixed housing supplied with lubricating oil. The housing has adjoining sections that are slideably connected to enable the housing to compensate for adjustments of the drum casing.

11 Claims, 4 Drawing Sheets

ROTATABLE DRUM

RELATED APPLICATION

This application is a continuation-in-part of application Ser. No. 764,341, filed Aug. 12, 1985, abandoned.

BACKGROUND OF THE INVENTION

This invention relates to a rotating drum of the kind adapted for use as a tube mill, a mixing or drying drum, a rotary kiln, and the like, in which the material to be treated (e.g., comminuted, mixed or subjected to heat exchange) is moved through the drum in the axial direction.

These rotating drums have comparatively large dimensions both in the axial direction and in their diameter. Sometimes the drum must be adjusted relative to its drive, during assembly or in use, so particular attention must be directed to the rotary mounting and the drive. It is known for one or more bearing rings, by means of which the rotating drum is supported on stationary bearing elements so as to be rotatably movable, to be fixed on the outer peripheral surface of a rotating drum. In order to set such a rotating drum in rotation in the desired manner, it is also known to provide a rotating drum drive which is either connected at the front end to a drive journal or engages via at least one drive pinion with a ring gear fixed on the outer peripheral surface of the rotating drum. The known rotating drum constructions generally necessitate comparatively high construction costs for mounting and rotary drive.

The object of the invention, therefore, is to provide an improved rotating drum of the type referred to above which constitutes a considerable structural simplification in comparison with known constructions, particularly with regard to the drum mounting and the rotary drive, while at the same time giving a particularly reliable and stable construction.

SUMMARY OF THE INVENTION

In the rotating drum according to the invention a bearing ring and a ring gear are firmly, but removably connected to one another by a radial ring flange so that they form an extremely stable assembly which requires only a relatively small amount of space and in which the ring flange at the same time represents a reinforcement of the bearing ring by means of which radial deformations of the bearing ring can be reduced to a minimum. This also results in improvements in the bearing capacity over the bearing width of the bearing ring and possibilities of savings on the inner reinforcement of the bearing ring which can either be of weaker construction or can be omitted completely.

The whole assembly of ring gear and bearing ring also makes it possible in an extremely advantageous manner to provide a common housing for the bearing elements of the bearing ring and the rotating drum drive, as a result of which it is possible amongst other things to achieve a further reduction in the space required and considerable simplifications of assembly, while enabling relative adjustment between the drum and its drive.

The use of a common housing is also favored by the fact that an axial guide is provided for the assembly of ring gear and bearing ring. This axial guiding ensures a particularly reliable operation of the rotating drum in the region of the ring gear and the bearing ring by means of a constantly good toothing engagement between the drive pinion and the ring gear and a very reliable mounting of the bearing ring on its bearing elements.

THE DRAWINGS

The invention will be explained in greater detail below with reference to the accompanying drawings, in which.

DETAILED DESCRIPTION

Figure 1:
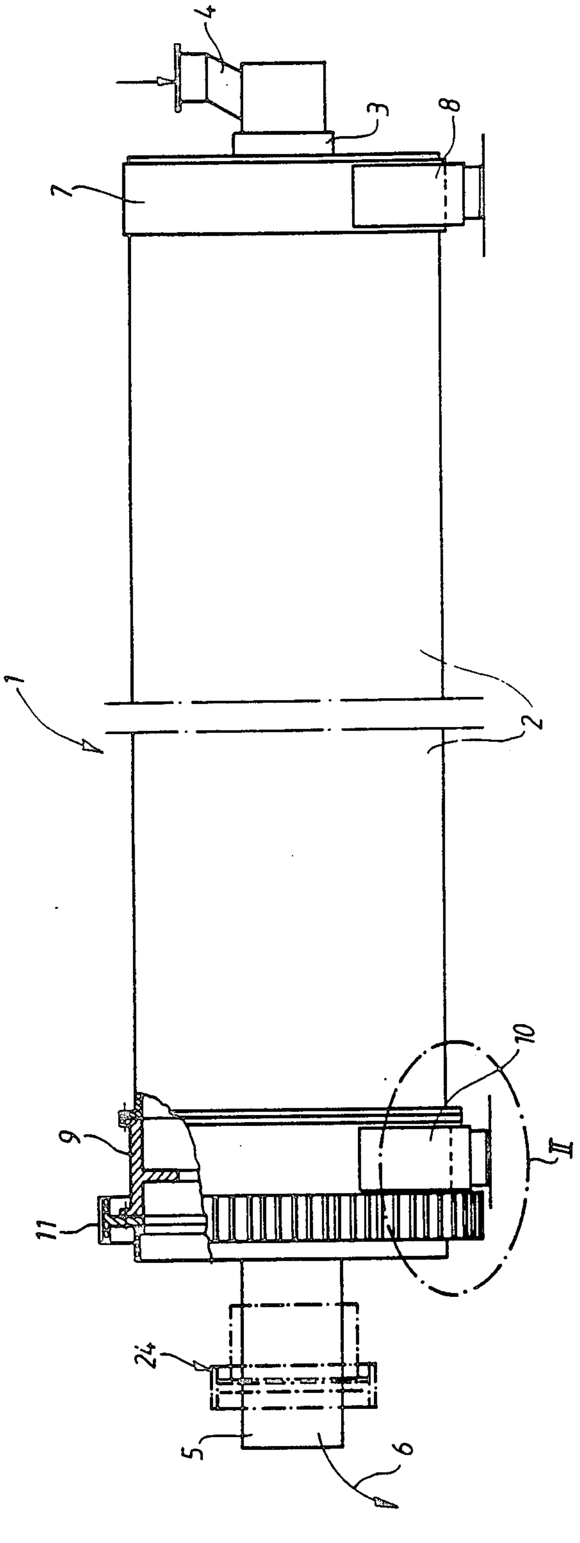
FIG. 1 is a schematic, partially cutaway assembly view of a rotating drum (omitting the drive)

In the drawings the rotating drum is illustrated in the form of a tube mill 1. According to FIG. 1 this tube mill 1 can largely be constructed and assembled in a manner which is known per se. It has a drum casing 2 and an inlet 4 for material to be ground leading into a hollow journal 3 at one end, namely the inlet end, and at the other end (outlet end) has a further hollow journal 5 through which sufficient comminuted material for grinding (arrow 6) is discharged from the mill.

On the outer peripheral surface of the rotating drum casing 2 of the rotating drum mill 1 illustrated in FIG. 1 a first bearing ring 7 is mounted coaxially therewith in the region of the inlet end, and this first bearing ring 7 can be supported on conventional bearing elements, i.e., either on rollers or as indicated in FIG. 1, on hydrostatic or hydrodynamic bearing shoes 8. In the region of the other end a second bearing ring 9 is mounted on the outer peripheral surface of the rotating drum casing 2 as a coaxial extension thereof and is supported so as to be rotatable in a similar manner to the first bearing ring 7 on bearing elements which are known per se, particularly hydrostatic or hydrodynamic sliding bearing shoes 10.

A ring gear 11 is also mounted coaxially on the outer peripheral surface of the rotating drum casing 2 so as to be fixed against rotation and, as will be explained in greater detail below, is mounted directly on the second bearing ring 9 and forms one assembly therewith. This ring gear 11 is in toothed engagement with at least one drive pinion 12 (FIG. 3) which is part of a rotating drum drive 13 which will be described in more detail below.

Figure 2:
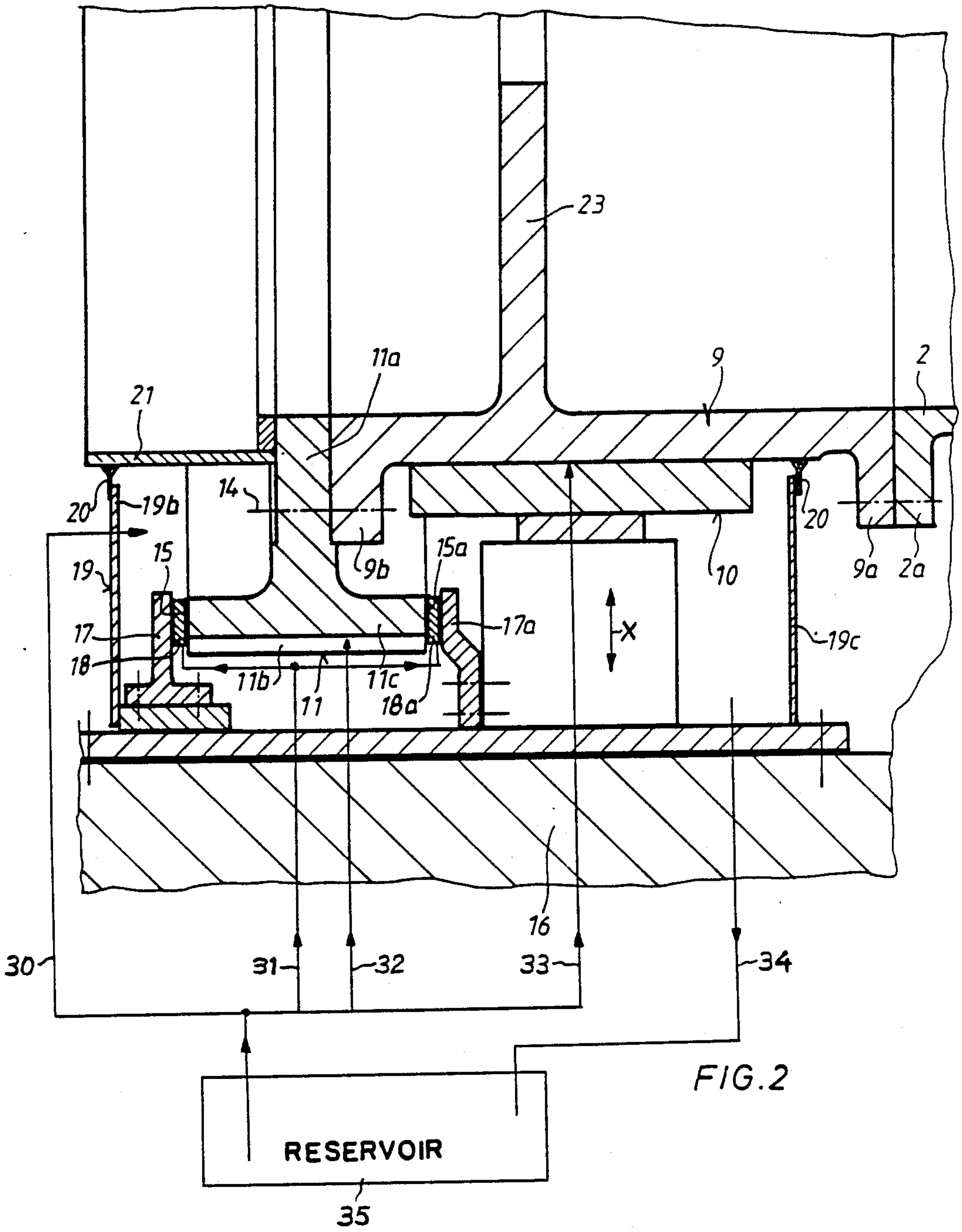
FIG. 2 is a detail on an enlarged scale in the region of the assembly of bearing ring, ring gear and rotating drum indicated at II in FIG. 1.

One embodiment of the assembly consisting of the ring gear 11 and the second bearing ring will in particular be explained in greater detail with the aid of FIG. 2.

In this example the second bearing ring 9 extends in axial prolongation of the drum casing 2 and is provided on each of its two axial ends with a radially extending ring flange 9*a* and 9*b*, both of which project radially outwards. The bearing ring 9 is separably or removably screwed to an end flange 2*a* of the rotating drum casing through the first ring flange 9*a* (as indicated by a dot-dash line), so that the bearing ring 9 represents an axial extension of the rotating drum casing 2. The ring 9 has a greater radial thickness than the drum casing 2.

The ring gear 11 is somewhat larger in external diameter than the bearing ring 9 and is removably screwed onto the second ring flange 9*b* of the bearing ring 9 (cf. central line 14 of the screws indicated by dot-dash line). The ring gear 11 advantageously has a T-shaped cross-section the stem 11*a* of which extends radially inwards and forms a type of mounting flange and serves as a counter-flange to the bearing ring flange 9*b*, while the drive teeth 11*b* are provided on the outer peripheral surface of the T-shaped flange 11*c*.

Thus in an advantageous manner the mounting screws of the bearing ring 9 and the ring gear 11 are fully accessible externally of the drum casing so as to enable the bearing ring and the ring gear to be mounted and replaced on the outer end of the casing 2. Because of this arrangement the ring gear 11 can advantageously be constructed in the form of an undivided, i.e., unitary, ring which is distinguished by its low overall height. At the same time the axial end faces of this ring gear 11 and particularly of the T-flange 11*c* thereof are preferably constructed so that they can serve as axial guide surfaces 15, 15*a*.

Two mountings 17, 17*a*, constructed in the form of partial ring flanges and having guide blocks 18, 18*a* made from bearing material, straddle the ring gear 11 and are in sliding engagement with the axial guide surfaces 15, 15*a*of the ring gear 11, and are fixed at least in the lower peripheral region of the tube mill 1 or the rotating drum casing 2 on the base 16. In this way the axial guide surfaces 15, 15*a* form with the fixed guide blocks 18, 18*a* an axial guide for the assembly of the ring gear 11 and the bearing ring 9, but permit adjustment of the casing transversely of its axis of rotation.

Figures 3, 4:
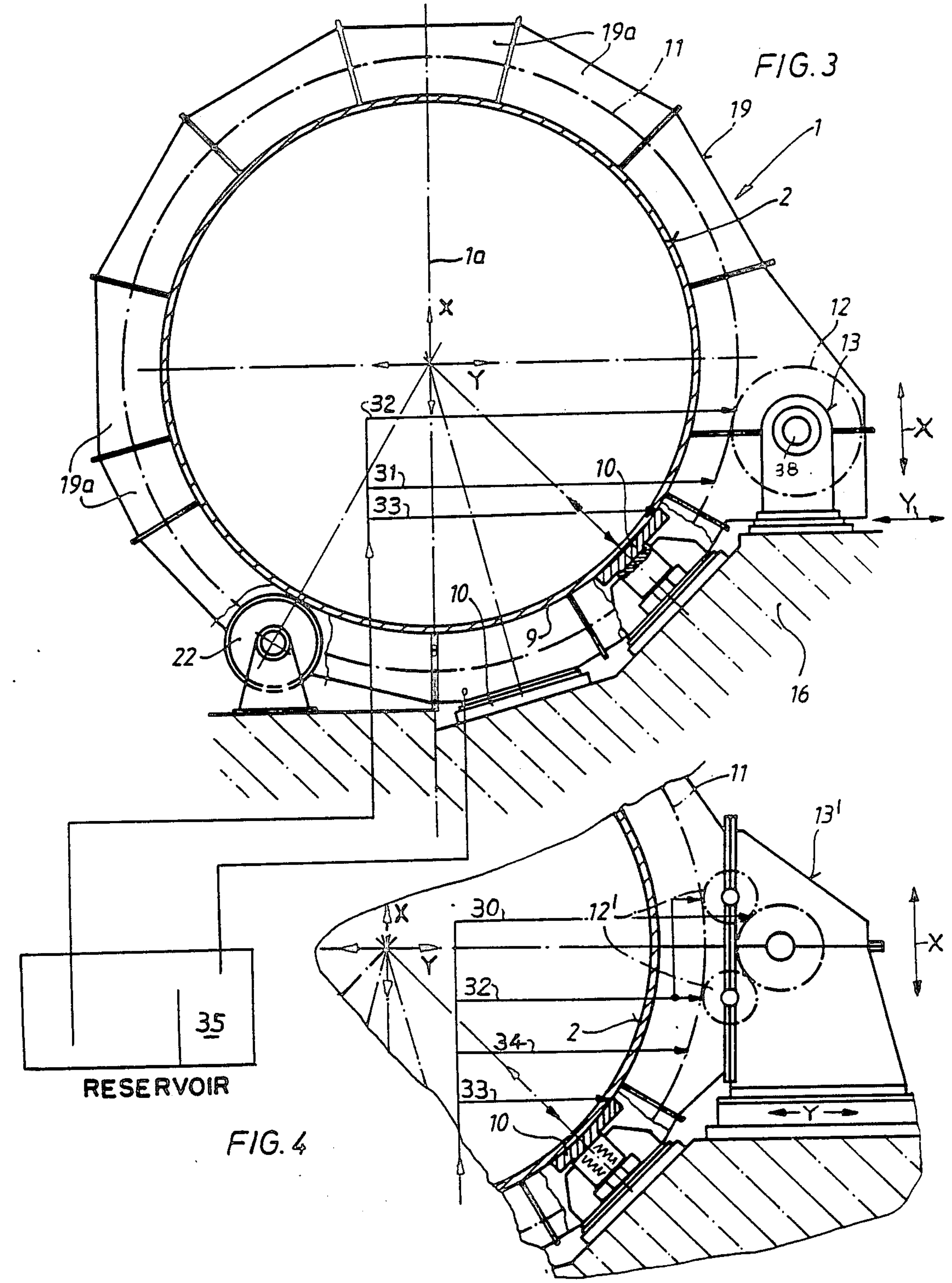
FIG. 3 is a cross-sectional view through the rotating drum illustrating the association of the rotating drum drive with the ring gear and of the bearing elements with the bearing ring, the bearing elements of two differing constructions being illustrated in the right-hand and left-hand halves of this FIG.
FIG. 4 is a variant of the construction according to FIG. 3 as regards the construction and connection of the rotating drum drive.

A stationary common housing 19 for the sliding bearing shoes 10 and the rotating drum drive 13 is also fixed on the base 16 on which the sliding bearing shoes 10 of the second bearing ring 9 and the rotating drum drive 13 are supported (cf. FIGS. 2 and 3). As can be seen in particular from FIG. 3, this housing 19 is made up of a plurality of segment-like housing parts 19*a* which can be easily assembled and dismantled in such a way that the common housing 19 also encloses the assembly of the second bearing ring 9 and the ring gear 11 so as to protect it.

This common housing 19 or the housing parts 19*a* thereof are provided with axially spaced end walls 19*b* and 19*c* (FIG. 2) on the radially inner edges of which suitable elements 20 are retained which are in frictional or sealing engagement with the outer peripheral surface of the bearing ring 9 or an axial annular extension 21 suitably provided on the ring gear 11.

The construction and arrangement of the housing 19 described above is a particularly favorable prerequisite for the provision of common lubrication by oil circulation for the ring gear 11 and its drive pinion 12 and for the second bearing ring 9 and the bearing elements thereof (sliding bearing shoes 10). The stationary guide blocks 18, 18*a* of the axial guiding arrangements for the assembly of bearing ring 9 and ring gear 11 described above are also located inside this common housing 19. As is shown in FIGS. 2 and 3 lubrication is effected by means of oil supply lines 30, 31, 32, and 33 and an oil return line 34, all of such lines being in communication with an oil reservoir 35. A pump (not shown) effects circulation of the oil in a conventional manner.

In FIG. 3 (right-hand half) the indicated rotating drum drive 13 is so constructed and arranged that it forms a drive pinion 12 in direct driving engagement with the ring gear 11. In addition to a considerable saving of space this also means that interposed drive elements, e.g., couplings, shafts, separate bearings etc., can be omitted. Thus the torque from the pinion is directly transmitted to the ring gear 11 of the tube mill 1.

The two principal possibilities for the construction of the bearing elements for the bearing ring 9 which are mounted below the tube mill 1 are also indicated in FIG. 3. In the right-hand half of FIG. 3 the bearing ring 9 is slideably and rotatably supported on a plurality (preferably four) of sliding bearing shoes 10, whereas in the left-hand half of the drawing (FIG. 3) preferably two rollers 22 arranged symmetrically with respect to the vertical longitudinal central plane of the tube mill 1 ensure a rotatable support for the tube mill 1 via its bearing ring.

The partial cross-section according to FIG. 4 shows a variant of the construction of the rotating drum drive 13′, which differs from that described above principally in that the rotating drum drive 13′ has two drive pinions 12′ for the ring gear 11. These two drive pinions 12′ can be arranged vertically one above the other in an advantageous and space-saving manner. Apart from this the variant according to FIG. 4 does not differ from the embodiment described above.

It is preferred that the drum casing 2 be adjustable relative to the base 16 in vertical and horizontal directions indicated by the arrows X and Y. For this purpose the supports for the bearing elements 10 may include threaded spindles (like jacks) or shims or adjusting screws for adjusting the position of the casing, and the supports for the rollers 22 may be provided with similar adjusting means for similar purposes. This makes possible adjustments of the casing not only during assembly, but also during use to compensate for operational variations which may occur.

Figure 5:
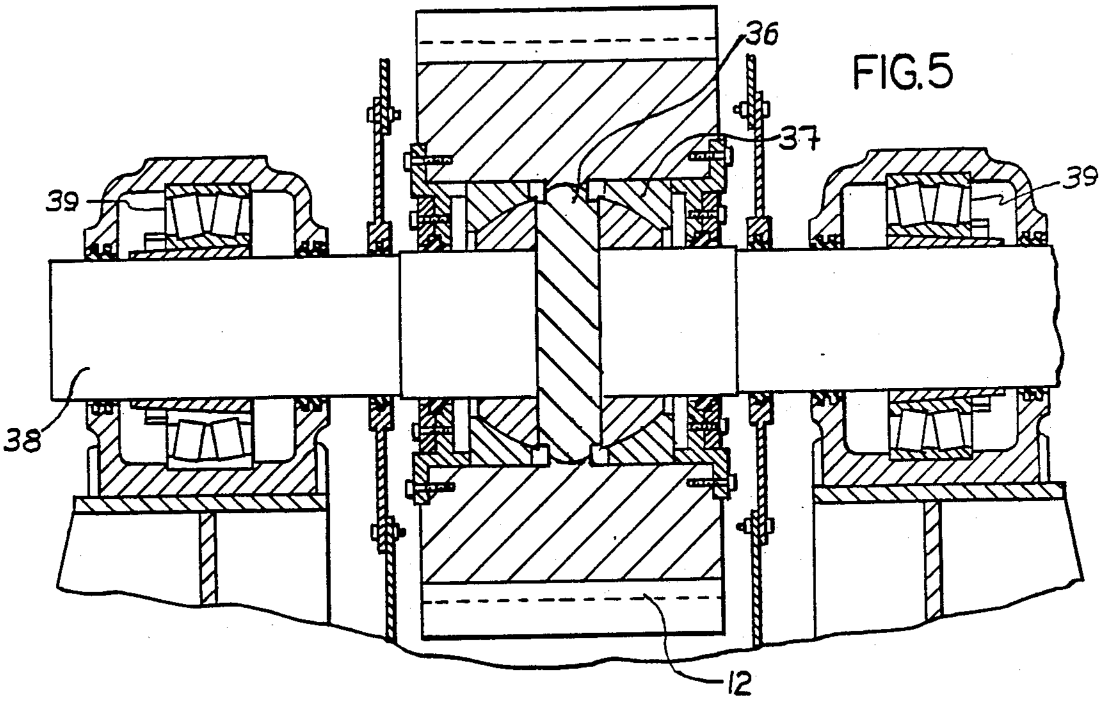
FIGS. 5 and 5*a* are sectional views illustrating the manner in which the drum drive may compensate for relative adjustment between it and the drum.
Figure 5A:
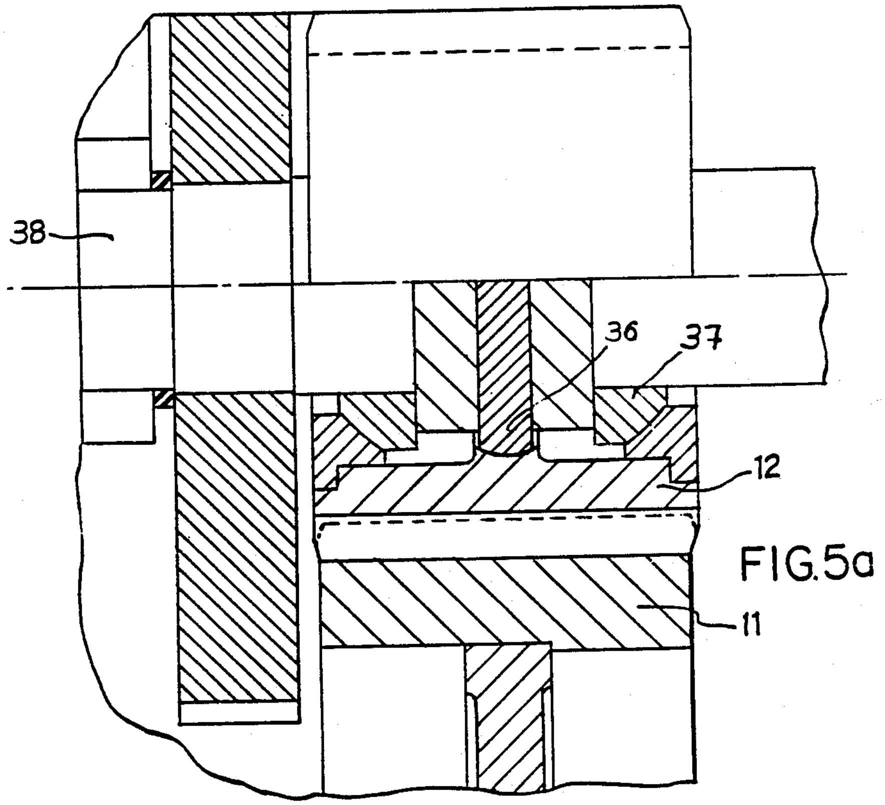

With regard to the construction and arrangement of each of the drive pinions 12 and 12′, it should be noted that it is preferable for each of these drive pinions to be constructed so as to be self-adjusting with the associated driven shaft of the rotating drum drive 13 or 13′ respectively. In this way it is possible to compensate for any axial displacement or movement of the rotating drum casing 2 which may occur. This construction is shown in FIGS. 5 and 5*a* wherein the driven shaft 38 of the drum drive is journalled in bearings 39 positioned on opposite sides of the drive pinions 12. Each pinion 12, 12′ is rockably supported by a spherical bearing 37 carried by the shaft 38. The torque is transmitted via curved tooth gearing 36 interposed between the shaft 38 and the pinion 12, 12′ which is similar to a toothed or jaw clutch coupling. The rockable support for the drive pinion enables a constant or uniform load distribution over the whole width of the teeth during engagement between the ring gear 11 and the pinion 12 and 12′. In addition, the supports for the drives 13, 13′ may be provided with known means for adjusting the pinions 12, 12′ in the directions of the arrows X and Y to ensure proper driving relationship with the ring gear 11.

To avoid the imposition of stress on the housing 19 due to adjustments of the drive casing, the confronting ends of the casing sections 19*a* are slideably connected in known manner, and between the confronting ends of the casing sections 19*a* a layer of known crushing material may be provided.

Naturally, numerous variations and modifications are possible within the scope of the invention. For example, as shown in FIG. 2, the bearing ring 9 can have a stem-like flange 23 running approximately radially inwards on its inner peripheral surface for the purpose of further reinforcement of the bearing ring. Furthermore, instead of the flange connection with the flanges 2*a* and 9*a*, the bearing ring 9 can be welded (as is known per se) directly axially onto the end face of the rotating drum casing 2 which faces it, while a ring flange (e.g., 9*b*) for fixing the ring gear 11 is in any case provided on the other end face of the bearing ring 9 (however, this ring flange provided for fixing the ring gear 11 does not have to be directed radially outwards but in case of need can also extend radially inwards).

A further variant of the construction is indicated by dot-dash lines in FIG. 1. According to this the assembly of ring gear and bearing ring does not have to be mounted in the region of the outer peripheral surface of the drum casing 2, but, as indicated by dot-dash lines at 24, also can be fixed on the outer peripheral surface of one journal pin or hollow journal, in the illustrated case the hollow journal 5 at the outlet. However, in this case the construction and arrangement can be the same as in the cases described above with appropriate adaptation.

Finally, the embodiments described above are not restricted only to tube mills, but all rotating drums (as mentioned in the introduction) can be constructed in the manner described.

We claim:

1. A rotary drum comprising a cylindrical drum casing; a base; bearing elements supported on said base adjacent opposite ends of said casing; a bearing carried by one end of said casing and journalling the latter in one of said bearing elements for rotation; a bearing ring having a flange at each of its opposite ends; a central bearing carried by said bearing ring between said flanges and journalled by the other of said bearing elements; a ring gear of T-shaped cross section having a radially inwardly extending stem; first coupling means securing one flange of said bearing ring to said casing as a coaxial extension thereof; second coupling means securing the other flange of said bearing ring to the stem of said ring gear, said stem projecting radially outwardly beyond said casing and said bearing ring and terminating in a cross flange having a toothed outer surface, said first and second coupling means being accessible wholly externally of said casing; a rotary drive shaft; at least one drive pinion in driving engagement with said ring gear; and self-adjusting means mounting said drive pinion on said shaft.

2. A drum according to claim 1 wherein said self adjusting mounting means comprises spherical bearing means.

3. A rotary drum comprising a cylindrical drum casing having at one of its ends a radially outwardly extending flange; a base; bearing elements supported on said base adjacent opposite ends of said casing; a bearing carried by said casing at its opposite end and journalling the latter in one of said bearing elements for rotation; a bearing ring having a radially outwardly extending flange at each of its opposite ends; a central bearing carried by said bearing ring between said flanges and journalled by the other of said bearing elements; a ring gear of T-shaped cross section having a single, radially inwardly extending stem; first coupling means extending axially of said drum and removably securing one flange of said bearing ring directly to the flange at said one end of said casing as a coaxial extension thereof; second coupling means extending axially of said drum and removably securing the other flange of said bearing ring directly to the stem of said ring gear, said stem projecting radially outwardly beyond said casing, said bearing ring, and said other flange of said bearing ring and terminating in a cross flange having a toothed outer surface, said first and second coupling means being accessible wholly externally of said casing; and rotary drive means in driving engagement with said ring gear, said rotary drive means having at least one drive pinion in driving engagement with said ring gear, said pinion being mounted on a drive shaft and torque from said drive shaft being transmitted to said pinion via curved tooth gearing, said pinion being self-adjusting relative to said shaft.

4. A drum according to claim 3 including axial guide means supported on said base in engagement with and straddling said ring gear.

5. A drum according to claim 4 wherein the ring gear comprises a unitary member having said axial guide surfaces on its axial end faces.

6. A drum according to claim 3 wherein said bearing elements comprise a plurality of rollers.

7. A drum according to claim 3 wherein said bearing elements comprise hydrostatic bearing shoes.

8. A drum according to claim 3 wherein said bearing elements comprise hydrodynamic bearing shoes.

9. A drum according to claim 3 wherein said pinion is mounted on said shaft via a spherical bearing means.

10. A drum according to claim 3 wherein said bearing elements and said rotary drive means are adjustable relative to the base.

11. A drum according to claim 3 including common oil circulation means for said ring gear, said bearing ring, and said bearing elements, and a common housing enclosing said circulation means.

* * * * *